Patented Nov. 26, 1935

2,022,456

UNITED STATES PATENT OFFICE 2,022,456

MANUFACTURE OF NEW CONDENSATION PRODUCTS FROM NATURAL RESINS

Josef Binapfl, Krefeld-Uerdingen-on-the-Rhine, Germany, assignor to I. G. Farbenindustrie Aktiengesellschaft, Frankfort-on-the-Main, Germany No Drawing. Application March 9, 1933, Serial No. 660,169. In Germany March 30, 1931

21 Claims. (Cl. 260—2)

The present invention concerns the manufacture of new products from natural resins, possessing improved properties, consisting in causing the resins, anhydrides or esters thereof to act on phenols, substitution products or functional derivatives thereof in the presence of inorganic volatile halides. Instead of the resins the resin acids isolated from the same, such as for example, abietic acid, can likewise be employed.

With the knowledge at present at my disposal, I suggest that the reaction probably proceeds essentially in the manner that one phenol molecule attaches itself at the double bond present in the resin molecule with formation of an oxyaryl derivative of the respective resin acid. It appears that the carboxylic groups of the resin thus remain in general unaltered. The reaction may be illustrated by the following formula:

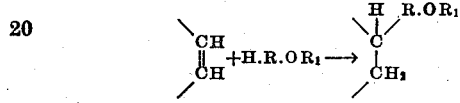

(Only the double bond required for the reaction is shown from the molecule of the resin acids; R represents an aromatic residue, $R_1$ a hydrogen atom or a substituent therefor such as an alkyl group, an aryl group or an acyl group).

In particular the new reaction products are distinguished from the starting materials by a much reduced iodine value and in general by a considerably raised softening point. Moreover, they do not give the Storch-Morawski color reaction, characteristic of natural resins, that is to say, the addition of acetic anhydride and concentrated sulphuric acid does not produce the blue coloration, characteristic of natural resins.

Among the natural resins and esters thereof, which are suitable for the manufacture of condensation products in accordance with the present invention, the following may be specially mentioned: colophony, pine resin, Batavian damar, gum mastic, copal, as well as esters of these resins with ethyl alcohol, dodecyl alcohol, glycol, glycerine, mannite, phenol and the like. In addition the mixed esters known under the name of alkyd resins and containing the residue of an acid from a natural resin besides the residues of a polyvalent alcohol and a polybasic acid are well adapted for the manufacture of the new conversion products. As examples of the said alkyd resins may be mentioned the condensation products obtainable from glycerine, polyglycols or polyglycerines, pentaerythrite, mannite, sorbite and the like by simultaneous or successive esterification with one of the above mentioned natural resins and a polybasic acid, such as phthalic acid, trimellitic acid, succinic acid, maleic acid and the like.

As examples of suitable phenolic components may be mentioned: phenol, naphthol, resorcinol, phenol derivatives, such as phenols alkylated in the nucleus, for example cresols and xylenols, furthermore chlorophenols, bromophenols, chloro nitrophenols, nitrophenols, chloro cresols etc. as well as phenol ethers, such as anisol, phenetol, diphenyl ether, ditolyl ether, furthermore phenol esters, such as cresol acetate, dicresol carbonate, phenol propionate, phenol stearate, phenol oleate, phenol benzoate, xylenol phthalate etc.

Volatile inorganic halides appropriate for the purpose of this invention are for example hydrogen halides, such as hydrogen chloride, furthermore aluminium chloride, titanium chloride, tin tetrachloride, boron fluoride etc., those halides being preferably used in a practically anhydrous condition. Instead of boron fluoride compounds of the same, for example, complex compounds with organic acids, such as formiato-fluoro-boric acid, acetato-fluoro-boric acid, chloroacetato-fluoro-boric acid, lactato-fluoro-boric acid, oleato-fluoro-boric acid, stearato-fluoro-boric acid, benzoato-fluoro-boric acid, phthalato-fluoro-boric acid, can also be employed as the condensing agents.

When employing solvents, preferably those are used which do not undergo a chemical change under the reaction conditions, such as for example, carbon tetrachloride and carbon disulphide etc. Furthermore hydrocarbons, such as benzene, toluene, ligroin, gasoline, tetrahydronaphthaline and the like are suitable for the purpose of this invention.

The temperature during the reaction may vary according to the conditions. I have obtained good results with temperatures above 0° C., more particularly with temperatures ranging from about 0° to about 200° C.

The conversion products obtainable by condensing natural resins with a phenol or substitution products thereof are capable of being esterified and etherified due to the presence of free carboxylic acid groups and free phenolic hydroxy groups, e. g. by means of ethylene oxide or alkyl or aralkyl halides, such as ethyl chloride, butyl chloride, amyl chloride, benzyl chloride, chloromethyl-isopropylnaphthaline, glycolchlorhydrin and the like, in the presence of an alkali. The carboxylic acid groups of the condensation products can be furthermore esterified by means of an alcohol, e. g. ethyl alcohol, dodecyl alcohol, glycol, glycerine, mannite, sorbite, phenol etc. Alternatively the free phenolic hydroxylic groups of the conversion products obtainable by condensing natural resins with a phenol as described above are capable of being esterified by means of acids, such as for example, by means of acetic anhydride or acid chlorides, such as acetyl chloride, oleic acid chloride, benzoyl chloride and the like. Furthermore the free phenolic hydroxyl groups of the condensation products obtainable from the esters of natural resins by means of free phenols can likewise be converted into further valuable products by etherifying, for example, by means of the above indicated alkyl- or aralkyl halides in the presence of an alkali or by esterifying the same, for example, by means of the above indicated acid anhydrides or acid halides. In addition the carboxylic acid groups present in the artificial products obtainable by condensing natural resins with functional derivatives of phenols, such as ethers and esters are obviously still capable of being esterified, for example, by means of the above indicated alcohols, alkyl halides or the like.

Example 1

100 parts by weight of a 25% solution of boron fluoride in technical crude cresol are introduced into a mixture of 300 parts by weight of American colophony (acid value 164, iodine value 175, acetyl value 5, softening point 79° C.) and 150 parts by weight of benzene in the course of 1–2 hours with stirring at about 30–40° C. A dark brown, viscous mass is produced, which is then further stirred for about 14 hours at room temperature (15–18° C.).

The resulting reaction product is then poured into cold water and the solvent is removed by means of steam.

A yellowish white solid brittle resin is thus obtained which is boiled with water and after melting yields a clear resin (325 parts by weight), possessing the following constants:

Acid value _____ 114
Iodine valve _____ 43.5
Acetyl value _____ 64.8
Softening point _____ 105° C.

The Storch-Morawski reaction is negative.

Example 2

When instead of a 25% solution of boron fluoride in technical crude cresol a 25% solution in phenol is employed a clear resinous condensation product possessing quite similar properties is obtained:

Acid value _____ 110
Iodine value _____ 51
Acetyl value _____ 60
Softening point _____ 110° C.

The Storch-Morawski reaction is negative.

Example 3

At a temperature of about 40° C. 60 parts by weight of acetato-fluoro-boric acid are introduced during 1–2 hours into a mixture of 300 parts by weight of colophony (acid value 168, iodine value 170, softening point 69°) 130 parts by weight of benzene and 75 parts by weight of technical crude cresol with stirring. After 20 hours the reaction product obtained is poured into cold water and the solvent removed by means of steam. Then the reaction mass is freed from acid by washing with water. After melting a clear resin is obtained possessing the following constants:

Acid value _____ 134
Acetyl value _____ 68
Softening point _____ 106–107° C.

Example 4

Gaseous hydrogen chloride is passed at room temperature for 40 hours into a stirred mixture of 100 parts by weight of American colophony, 120 parts by weight of carbon tetrachloride and 40 parts by weight of phenol. A dark reddish brown, viscous mass is produced, from which the solvent is removed by blowing in steam.

The residue consists of a yellowish mass, which is washed several times with boiling water and after melting yields a honey yellow resin (110 parts by weight), possessing the following constants:

Acid value _____ 144.2
Iodine value _____ 63.6
Acetyl value _____ 36.6
Softening point _____ 94° C.

It dissolves in acetic anhydride in the presence of a drop of concentrated sulphuric acid with a rose-red coloration.

Example 5

100–120 parts by weight of a 25% solution of boron fluoride in crude cresol are introduced in the course of 1–2 hours with stirring at about 40° C. into a mixture of 400 parts by weight of the glycerine ester of colophony (acid value 15, iodine value 170, acetyl value 8, softening point 83° C.) and 200 parts by weight of benzene. A violet red mass, which later becomes reddish brown is produced, which is then further stirred at room temperature for about 14 hours. Thereupon the resulting reaction product is poured into cold water and the solvent and unchanged cresol removed by means of steam.

A yellowish white resinous mass is thus obtained, which is washed with water. After melting it yields a clear resin (420 parts by weight), possessing the following constants:

Acid value _____ 16
Iodine value _____ 48
Acetyl value _____ 68
Softening point _____ 98° C.

The Storch-Morawski reaction is negative.

Example 6

25 parts by weight of a 25% solution of boron fluoride in technical crude cresol are introduced into a mixture of 100 parts by weight of the glycerine ester of colophony (softening point 72° C.) and 150 parts by weight of tetraline at a temperature of 150° C. with stirring. After 30 minutes the Storch-Morawski reaction is negative. Then the reaction product is diluted with 200 parts of tetraline and 25 parts by weight of calcium oxide and 20 parts by weight of fuller's earth are added and the mixture thus obtained stirred for about 1 hour at a temperature of about 40–50° C. After filtering this mixture the solvent is removed by distillation. 105 parts by weight of a clear light brown resin are obtained, possessing a softening point of 97–98° C.

Example 7

Gaseous hydrogen chloride is passed at room temperature for about 40 hours into a stirred mixture of 100 parts by weight of the above resin ester, 120 parts by weight of carbon tetrachloride and 36 parts by weight of phenol. A violet brown viscous mass, which later becomes dark brown is produced from which the solvent is removed by means of steam.

The residue consists of a yellowish mass, which is washed with water. After melting a honey yellow resin (105 parts by weight) is obtained, possessing the following constants:

| | |
|---|---|
| Acid value | 18 |
| Iodine value | 59 |
| Acetyl value | 36 |
| Softening point | 90° C. |

It dissolves with a pale rose-red coloration in acetic anhydride in the presence of a drop of concentrated sulphuric acid.

Example 8

31 parts by weight of a 25% solution of boron fluoride in technical cresol are introduced at room temperature in the course of 6 hours into a mixture of 130 parts by weight of the glycerine ester of kauri copal (acid value 22, acetyl value 18, softening point 128–129° C.) and 60 parts by weight of benzene; a reddish brown mass is produced, which is further stirred for some 16 hours. The resulting reaction product is poured into cold water, the solvent removed by means of steam and the product washed until free from acid. After melting a yellowish brown resin (140 parts by weight) is produced, possessing the following constants:

| | |
|---|---|
| Acid value | 25 |
| Acetyl value | 68 |
| Softening point | 136–138° C. |

Example 9

To a solution of 300 parts by weight of colophony glycol ester (acid value 24, acetyl value 16, softening point 73–74° C.) in 130 parts by weight of benzene there are slowly added at room temperature 100 parts by weight of a 25% solution of boron fluoride in cresol; an intensely violet colored reaction mass is produced, which is further stirred for about 20 hours. It is worked up in the same manner as described in Example 8 and after melting yields a clear yellow resin, possessing the following constants:

| | |
|---|---|
| Acid value | 25 |
| Acetyl value | 69 |
| Softening point | 96° C. |

Example 10

300 parts by weight of a condensation product obtained from 640 parts by weight of colophony, 216 parts by weight of glycerine and 296 parts by weight of phthalic anhydride (acid value 12 and softening point 95° C.) are dissolved in 300 parts by weight of benzene. 85 parts by weight of a 20% solution of boron fluoride in technical crude cresol are introduced into the solution of this condensation product at 40–50° C. with vigorous stirring. The dark brown solution thus obtained is stirred for 14 hours. After this time the reaction product does no more produce the Storch-Morawski color reaction. The solvent is removed by means of steam and the remaining resin freed from acid by washing with water. Then the resin is melted in a nitrogen current. A clear resin is thus obtained having a softening point of 117° C.

Example 11

75 parts by weight of a 30% solution of boron fluoride in phenetol are introduced in the course of 3½–4½ hours at room temperature (15–18° C.) into a mixture of 300 parts by weight of colophony (acid value 164, iodine value 175, softening point 79° C.), 25 parts by weight of phenetol and 150 parts by weight of benzene. A dark brown mass is produced, which is further stirred for some 17 hours at room temperature. The reaction product is then decomposed by means of water, the solvent is removed by means of superheated steam and the product washed until free from acid. A straw yellow colored resinous mass is thus obtained, which after melting yields a clear amber colored resin (330 parts by weight), possessing the following constants:

| | |
|---|---|
| Acid value | 103 |
| Iodine value | 23 |
| Ethoxy value | 2.5% (calculated 2.7%) |
| Softening point | 96–97° C. |

The Storch-Morawski reaction is negative. By esterifying with glycerine a clear resin is produced, possessing a softening point of 102° C.

Example 12

By replacing the phenetol in Example 11 by anisol a quite similar product (320 parts by weight) is obtained, possessing the following constants:

| | |
|---|---|
| Acid value | 108 |
| Iodine value | 29 |
| Methoxy value | 2.3% (calculated 2.45%) |
| Softening point | 95–96° C. |

Example 13

50 parts by weight of tin tetrachloride are introduced with vigorous stirring at a temperature of 45–60° C. in the course of 4 hours into a mixture of 300 parts by weight of colophony (acid value 164, iodine value 175, softening point 79° C.), 100 parts by weight of m-cresol methyl ether and 350 parts by weight of toluene. After stirring for 30 hours, 200 parts by weight of toluene and 250 parts by weight of calcium oxide are added. Then the mixture is stirred at 40° C. still for 3–4 hours. The precipitate formed is filtered off and the volatile solvents are removed from the filtrate by distillation under diminished pressure. 322 parts by weight of a clear resin possessing the following constants are obtained:

| | |
|---|---|
| Acid value | 118 |
| Iodine value | 75 |
| Softening point | 94–95° C. |

The resin is easily soluble in linseed oil and white spirit on warming.

Example 14

75 parts by weight of a 30% solution of boron fluoride in phenetol are introduced with stirring and cooling (about 18–19° C.) in the course of 4 hours into a mixture of 300 parts by weight of the glycerine ester of colophony (acid value 25, iodine value 170, acetyl value 10, softening point 81° C.), 150 parts by weight of benzene and 25 parts by weight of phenetol.

A wine red solution is gradually produced, which is further stirred at room temperature for some 16 hours. The viscous reaction product is decomposed with cold water, the solvent removed by means of steam and the residue washed until free from acid. A bright yellow resinous product is obtained, which after melting yields a clear resin possessing the following constants:

Acid value_____ 25
Iodine value_____ 30
Acetyl value_____ 15
Ethoxy value____ 1.9% (calculated 1.9%)
Softening_____ 100–101° C.

*Example 15*

By employing anisol instead of phenetol a quite similar product (308 parts by weight) is obtained, possessing the following constants:

Acid value_____ 24
Iodine value_____ 31
Acetyl value_____ 15
Methoxyl value_____ 1.9% (calculated 2.04%)

*Example 16*

300 parts by weight of colophony (acid value 164, iodine value 175, softening point 79° C.) and 150 parts by weight of diphenylether are dissolved in 150 parts by weight of benzene. About 50 parts by weight of gaseous boron fluoride are passed into this solution at room temperature in the course of 6–7 hours. A violet colored solution is produced, which after stirring for 50 hours at room temperature no longer gives the Storch-Morawski reaction. The solvent is then removed by means of superheated steam and the yellow resinous residue washed until free from acid. After melting a clear resin is obtained possessing the following constants:

Acid value_____ 95
Iodine value_____ 42
Softening point_____ 95–96° C.

*Example 17*

18 parts by weight of boron fluoride are introduced at a temperature of 70–80° C. in the course of 6 hours into a mixture of 300 parts by weight of colophony (acid value 167, iodine value 130, softening point 70°), 150 parts by weight of o-cresol acetate and 100 parts by weight of benzene. After standing at room temperature for about 14 hours the viscous, brown reaction product is diluted with 200 parts by weight of benzene and 34 parts by weight of sodium carbonate are incorporated. The precipitate formed is filtered off and the volatile solvents are removed from the filtrate by distillation under diminished pressure. 331 parts by weight of a clear resin are obtained possessing the following constants:

Acid value_____ 41
Iodine value_____ 82
Softening point_____ 106

*Example 18*

24 parts by weight of boron fluoride are introduced with stirring at a temperature of about 80° C. in the course of 4 hours into a mixture of 300 parts by weight of the colophony used in Example 17, 100 parts by weight of benzene and 100 parts by weight of dicresol carbonate. After standing for about 12 hours at room temperature the brown reaction product is diluted with 200 parts by weight of benzene and 46 parts by weight of sodium carbonate are incorporated. After filtering off the precipitate formed the volatile solvents are removed from the filtrate by distillation under diminished pressure. 334 parts by weight of a clear resin possessing the following constants are obtained:

Acid value_____ 42
Softening point_____ 98

*Example 19*

By replacing the colophony in Example 17 by the glycerine ester of colophony (acid value 7.8, softening point 76, iodine value 119) and using 25 parts by weight of boron fluoride, 330 parts by weight of a clear resin are obtained, possessing the following constants:

Acid value_____ 8
Iodine value_____ 81
Softening point_____ 99

It may be mentioned that new products possessing still further valuable properties may be obtained by causing aldehydes to react with the condensation products obtainable by reacting with natural resins or esters thereof on phenol esters, for example, with the condensation product obtained in accordance to the Examples 17, 18 and 19 above.

This application is a continuation in part of my co-pending application Serial No. 601,040, filed March 24th, 1932.

I claim:

1. The process which comprises reacting with a material selected from the group consisting of natural resins and esters of natural resins upon material selected from the group consisting of phenols, phenols alkylated in the nucleus, alkyl ethers and esters of phenols in the presence of material selected from the group consisting of boron fluoride and a complex compound of boron fluoride with an organic acid.

2. The process which comprises reacting with a material selected from the group consisting of natural resins and esters of natural resins upon material selected from the group consisting of phenols, phenols alkylated in the nucleus, alkyl ethers and esters of phenols in the presence of boron fluoride.

3. The process which comprises reacting with a natural resin upon a phenol in the presence of boron fluoride.

4. The process which comprises reacting with a natural resin upon a phenol in the presence of boron fluoride and a solvent.

5. The process which comprises reacting with colophony upon cresol in the presence of boron fluoride and benzene as a solvent at a temperature of about 30–40° C.

6. A resinous product obtainable by reacting with a material selected from the group consisting of natural resins and esters of natural resins upon a material selected from the group consisting of phenols, phenols alkylated in the nucleus, alkyl ethers and esters of phenols in the presence of material selected from the group consisting of boron fluoride and a complex compound of boron fluoride with an organic acid, the reaction product being distinguished from the starting materials by a much reduced iodine value and by the non-appearance of the blue color reaction on the addition of acetic anhydride and concentrated sulfuric acid, this reaction being known as the Storch-Morawski color reaction characteristic of natural resins.

7. A resinous reaction product obtainable by reacting with a material selected from the group consisting of natural resins and esters of natural resins upon material selected from the group consisting of phenols, phenols alkylated in the nucleus, alkyl ethers and esters of phenols in the presence of boron fluoride and a solvent, this reaction product being distinguished from the starting materials by a much reduced iodine value and by the non-appearance of the blue color reaction on the addition of acetic anhydride and concentrated sulfuric acid, this reaction being known as the Storch-Morawski color reaction, characteristic of natural resins.

8. A resinous reaction product obtainable by reacting with a natural resin upon a phenol in the presence of boron fluoride, being distinguished from the starting materials by a much reduced iodine value and by the non-appearance of the blue color reaction on the addition of acetic anhydride and concentrated sulfuric acid, this reaction being known as the Storch-Morawski color reaction, characteristic of natural resins.

9. A resinous reaction product obtainable by reacting with a natural resin upon a phenol in the presence of boron fluoride and a solvent, this reaction product being distinguished from the starting materials by a much reduced iodine value and by the non-appearance of the blue color reaction on the addition of acetic anhydride and concentrated sulfuric acid, this reaction being known as the Storch-Morawski color reaction, characteristic of natural resins.

10. A resinous reaction product obtainable by reacting with colophony upon cresol in the presence of boron fluoride and benzene as a solvent at a temperature of about 30–40° C.

11. The process which comprises reacting with an ester of a natural resin upon a phenol in the presence of boron fluoride.

12. The process which comprises reacting with an ester of a natural resin upon a phenol in the presence of boron fluoride and a solvent.

13. A resinous reaction product obtainable by reacting with an ester of a natural resin upon a phenol in the presence of boron fluoride, being distinguished from the starting materials by a much reduced iodine value and by the non-appearance of the blue color reaction on the addition of acetic anhydride and concentrated sulfuric acid, this reaction being known as the Storch-Morawski color reaction, characteristic of natural resins.

14. A resinous reaction product obtainable by reacting with an ester of a natural resin upon a phenol in the presence of boron fluoride and a solvent, this reaction product being distinguished from the starting materials by a much reduced iodine value and by the non-appearance of the blue color reaction on the addition of acetic anhydride and concentrated sulfuric acid, this reaction being known as the Storch-Morawski color reaction, characteristic of natural resins.

15. A resinous reaction product obtainable by reacting with colophony glycerine ester upon cresol in the presence of boron fluoride and benzene as a solvent at a temperature of about 40° C., this reaction product having an iodine value of 48, a softening point of 98 and being furthermore distinguished from the starting materials by the non-appearance of the blue color reaction at the addition of acetic anhydride and concentrated sulfonic acid, this reaction being known as the Storch-Morawski color reaction, characteristic of natural resins.

16. The process which comprises reacting with an ester of a natural resin upon an ether of a phenol in the presence of boron fluoride.

17. The process which comprises reacting with an ester of a natural resin upon an ether of a phenol in the presence of boron fluoride and a solvent.

18. The process which comprises reacting with the glycerine ester of colophony upon phenetol in the presence of boron fluoride and benzene as a solvent at a temperature of about 18–19° C.

19. A resinous reaction product obtainable by reacting with an ester of a natural resin upon an ether of a phenol in the presence of boron fluoride, being distinguished from the starting materials by a much reduced iodine value and by the non-appearance of the blue color reaction on the addition of acetic anhydride and concentrated sulfuric acid, this reaction being known as the Storch-Morawski color reaction, characteristic of natural resins.

20. A resinous reaction product obtainable by reacting with an ester of a natural resin upon an ether of a phenol in the presence of boron fluoride and a solvent, this reaction product being distinguished from the starting materials by a much reduced iodine value and by the non-appearance of the blue color reaction on the addition of acetic anhydride and concentrated sulfuric acid, this reaction being known as the Storch-Morawski color reaction, characteristic of natural resins.

21. A resinous reaction product obtainable by reacting with the glycerine ester of colophony upon phenetol in the presence of boron fluoride and benzene as a solvent at a temperature of about 18–19° C., this resinous product having an iodine value of 31, a methoxyl value of 1.9, and being distinguished from the starting materials by the non-appearance of the blue color reaction at the addition of acetic anhydride and concentrated sulfuric acid, this reaction being known as the Storch-Morawski color reaction, characteristic of natural resins.

JOSEF BINAPFL.